United States Patent
Dautzenberg

(12)
(10) Patent No.: US 6,186,322 B1
(45) Date of Patent: Feb. 13, 2001

(54) DEVICE FOR REMOVING A COMPACTS DISK FROM ITS CONTAINER

(76) Inventor: Joseph Hubertus Dautzenberg, Banebergpassage 122, NL-6371 HW Landgraaf (NL)

(*) Notice: Under 35 U.S.C. 154(b), the term of this patent shall be extended for 0 days.

(21) Appl. No.: 09/335,607

(22) Filed: Jun. 18, 1999

(51) Int. Cl.$^7$ .................................................. B65D 85/57
(52) U.S. Cl. ........................................ 206/310; 206/308.1
(58) Field of Search ................................. 206/308.1, 310, 206/493; D8/395

(56) References Cited

U.S. PATENT DOCUMENTS

| | | | | |
|---|---|---|---|---|
| D. 383,055 | * | 9/1997 | Dautzenberg | .......................... D8/395 |
| 4,499,994 | * | 2/1985 | Rentch | ............................. 206/310 X |
| 5,400,902 | * | 3/1995 | Kaminski | ............................. 206/310 |
| 5,402,882 | * | 4/1995 | Bandy et al. | ......................... 206/310 |
| 5,526,926 | * | 6/1996 | Deja | .................................. 206/308.1 |

* cited by examiner

Primary Examiner—Bryon P. Gehman
(74) Attorney, Agent, or Firm—Ladas & Parry

(57) ABSTRACT

A device for removing a compact disk from a container, wherein the container has a bottom surface and a plurality of resilient fingers for removably holding the compact disk in the container. The fingers are disposed in a center of the container in spaced relation to one another such that the disk is mountable in the container with the fingers disposed in a central opening of the compact disk so as to hold the disk with the disk resting on the bottom surface. The device includes: (a) a spring of thin resilient material that is mountable in the container with respective end portions of the spring extending through spaces between the plurality of fingers; and (b) a push button mountable in the container for applying a downward force for deforming the spring. The push button includes supports having a plurality of portions each of which is insertable into a bend in the spring to cause a force exerted downwardly against the push button to deform the spring so as to increase the force that the spring exerts against a compact disk at a second bend in the spring. In a preferred embodiment, the device is used with a container having twelve fingers.

13 Claims, 1 Drawing Sheet

DEVICE FOR REMOVING A COMPACTS DISK FROM ITS CONTAINER

FIELD OF INVENTION

The invention is a device for the removal of compact disks from their containers. Compact disks are usually packaged in plastic boxes, containing a holder tray which keeps the disk immobile with resilient fingers in the central opening of the disk. To take the disk out it is necessary to the depress the fingers and at the same time lift the disk out. This is a conflicting movement. The invention makes it easy to remove the disk, in that by pressing the device a spring lifts the disk and the disk can easily be taken out. The invention is meant in particular for those holding trays with twelve resilient mounting fingers.

BACKGROUND OF INVENTION

For holding trays with eight resilient mounting fingers there is a device described in PCT application WO 94 05010. This device is not fit for use in a holder tray with twelve mounting fingers because the space between the mounting fingers is limited especially towards the center. While the spring has to be strong enough to lift the disk, there is a limit to the width of the spring. Mounting the device is impossible because the spring will not pass between the fingers and would be bent and thus rendered useless.

For holding trays with 12 mounting fingers there is a device known from European patent application EP-A-429195. A four-armed spring urges the disk upwards when the mounting fingers are pressed, This publication describes also a push button with pivoting arms. Both applications have the arms resting upon the resting surface of the container, resulting in less gripping surface of the mounting fingers and only a four point resting of the disk. This could lead to deformation of the disk.

SUMMARY OF INVENTION

The invention offers an improved device which is reliable in lifting the compact disk when the device is pressed. To obtain this feature the device has supports for the spring which prevent deformation of the spring and widen the space between mounting fingers. Rotation of the device is also prevented by the spring support.

BRIEF DESCRIPTION OF THE DRAWINGS

The invention is described with reference to the drawings.

DETAILED DESCRIPTION

Figure 1:
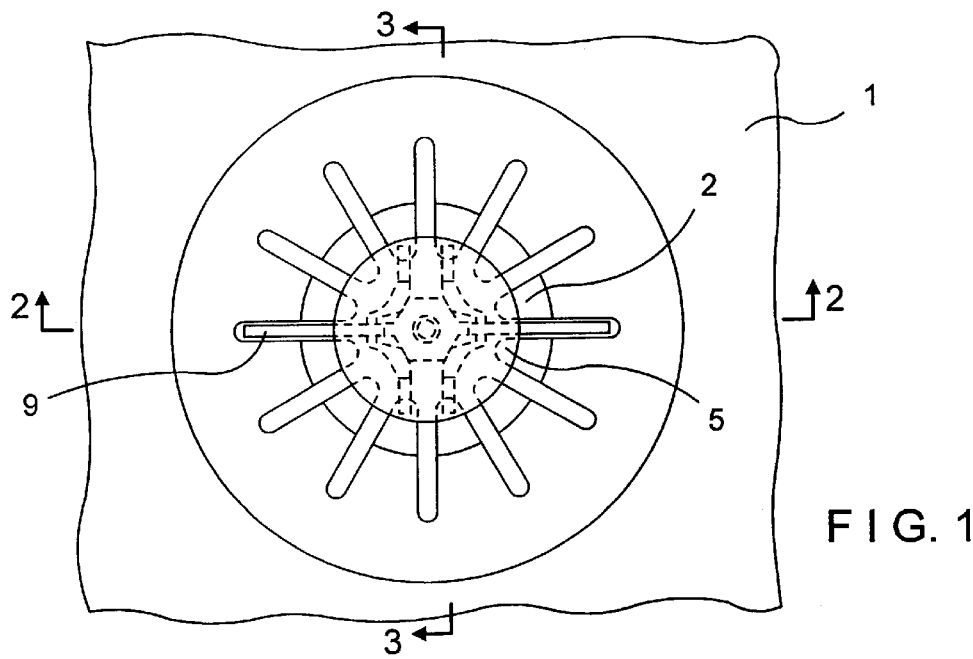
FIG. 1 shows the device of the invention placed in a holding tray.

In FIG. 1, holder tray (1) has mounting fingers (2) holding compact disk (3) immobile. Device (4) has a push button (5) which rests upon the mounting fingers (2). Push button (5) has a diameter which is smaller than the central opening in the compact disk. Attached to push button (5) are spring supports (6). These spring supports are perpendicular to push button (5) and extend between mounting fingers (2). The spring supports (6) have a thickness that allows the spring supports (6) to fit easily between the mounting fingers (2). The spring supports have a shape that approximates that of a triangle with a rounded top. Attached to the push button (5) are hooks (7) to fix the device (4) to the mounting fingers (2). Hooks (7) grip under mounting fingers (2).

Figure 2:
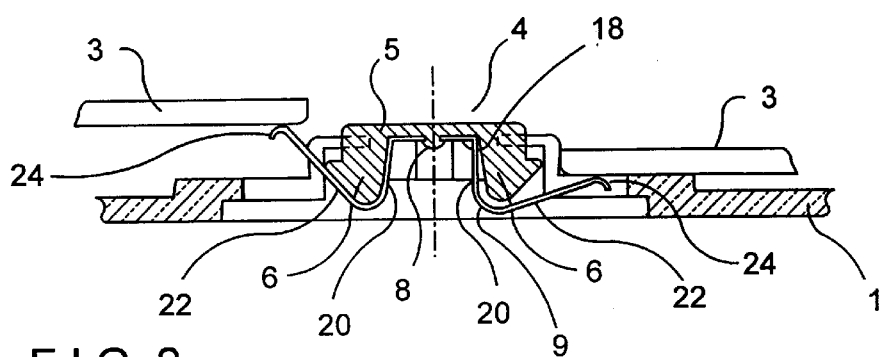
FIG. 2 shows section 2—2 of FIG. 1 with, on one side, a disk in lifted position and, on the other side, the disk in fixed position.
Figure 3:
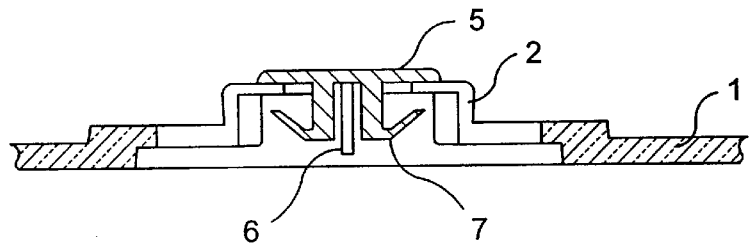
FIG. 3 shows a section 3—3 of FIG. 1.
Figure 4:
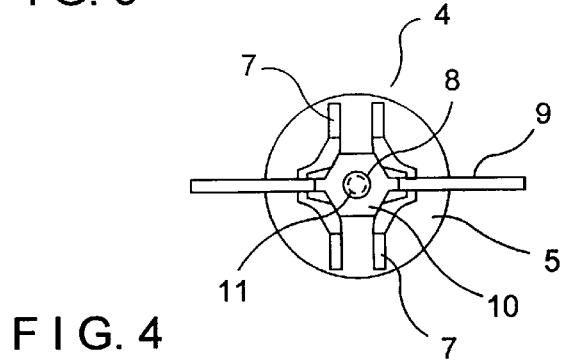
FIG. 4 shows the underside of the device shown in FIG. 1.

The ejector spring (9) is fastened to device (4) by deforming extension (8). Ejector spring (9) has a porton (10) of hexagonal shape with a hole (11) for fastening. From the hexagonal portion (10) expand two arms, Ejector spring (9), when seen from the side, has an inverted "U" shape portion with a base (18) and with legs having first portions (20) that extend downwardly toward the holder tray (1) in FIG. 2. Second portions (22) of the legs are bent-up about 135 degrees with a large radius. Third portions (24) at the ends of second portions (22) are bent down with a large radius (see FIG. 2). The shape of the spring support (6) is close fitting to ejector spring (9) when the spring is relaxed. Ejector spring (9) is manufactured from thin resilient metal In FIG. 2 on the right side the compact disk (3) is retained by holding tray (1) and ejector spring (9) pushes with resilience against the compact disk (3). The resilience is sufficient to exert a lifting force on the disk but not enough to remove it from the tray, In FIG. 2, on the left, the compact disk (3) is lifted by ejector spring (9) after device (4) has been pushed down

What is claimed is:

1. A device for removing a compact disk from a container, wherein the container comprises a bottom surface and a plurality of resilient fingers for removably holding the compact disk in the container, the compact disk comprising a central opening, said fingers being disposed in a center of the container in spaced relation to one another such that the disk is mountable in the container with the fingers disposed in the central opening to hold the disk and with the disk resting on the bottom surface, said device comprising:

(a) a spring of thin resilient material that is mountable in the container with respective end portions of the spring extending through spaces between the plurality of fingers, said spring comprising a base portion with a plurality of legs extending therefrom, the legs having (i) first portions that extend downwardly toward the bottom surface of the container with the spring mounted in the container, said base portion and first portions collectively having an inverted U shape, (ii) second portions that are bent upwardly with respect to the respective first portions such that the first and second portions form respective first bends of curved shape therebetween; and (iii) third portions that are bent downwardly with respect to the respective second portions such that the second and third portions form respective second bends of curved shape therebetween; said spring for exerting a force against the compact disk at the respective second bends with the fingers holding the compact disk and with the spring mounted in the container; and (b) push means mountable in the container for applying a downward force for deforming the spring, said push means comprising support means having a plurality of portions each of which is insertable into one of the first bends for causing a force exerted downwardly against the push means to deform the spring so as to increase the force that said spring exerts against the compact disk at the respective second bends with the fingers holding the compact disk and with the spring and push means mounted in the container.

2. A device according to claim 1, wherein the push means further comprises hook means for affixing the device to the fingers.

3. A device according to claim 2, wherein each of the plurality of portions of the support means has the shape of a triangle with a rounded vertex.

4. A device according to claim 3, wherein the second portions of the legs are bent upwardly with respect to the first portions at an angle of about 135 degrees.

5. A device according to claim 3, wherein the spring has a portion with a hexagonal shape.

6. A device according to claim 5, wherein two of the plurality of legs extend diametrically with respect to one another.

7. An apparatus for use with a compact disk having a central opening, said apparatus comprising (i) a container; the container comprising a bottom surface and a plurality of resilient fingers for removably holding the compact disk in the container, said fingers being disposed in a center of the container in spaced relation to one another such that the disk is mountable in the container with the fingers disposed in the central opening holding the disk and with the disk resting on the bottom surface; and (ii) a device for removing the compact disk from the container, said device comprising (a) a spring of thin resilient material that is mounted in the container with respective portions of the spring extending through spaces between the plurality of fingers, said spring comprising a base portion with a plurality of legs extending therefrom, the legs having (i) first portions that extend downwardly toward the bottom surface of the container, said base portion and first portions collectively having an inverted U shape, (ii) second portions that are bent upwardly with respect to the respective first portions such that the first and second portions form respective first bends of curved shape therebetween; and (iii) third portions that are bent downwardly with respect to the respective second portions such that the second and third portions form respective second bends of curved shape therebetween; said spring for exerting a force against the compact disk at the respective second bends with the fingers holding the compact disk and with the spring mounted in the container; and (b) push means mounted in the container for applying a downward force for deforming the spring, said push means comprising support means having a plurality of portions each of which is insertable into one of the first bends for causing a force exerted downwardly against the push means to deform the spring so as to increase the force that said spring exerts against the compact disk at the respective second bends with the fingers holding the compact disk and with the spring and push means mounted in the container.

8. An apparatus according to claim 7, wherein the push means comprises hook means for affixing the device to the fingers.

9. An apparatus according to claim 8, wherein each of the plurality of portions of the support means generally has the shape of a triangle with a rounded vertex.

10. An apparatus according to claim 9, wherein the second portions of the legs are bent upwardly with respect to the first portions at an angle of about 135 degrees.

11. An apparatus according to claim 9, wherein the spring has a portion with a hexagonal shape.

12. An apparatus according to claim 11, wherein two of the plurality of legs extend diametrically with respect to one another.

13. An apparatus according to claim 7, wherein the container has twelve of the fingers.

\* \* \* \* \*

UNITED STATES PATENT AND TRADEMARK OFFICE
CERTIFICATE OF CORRECTION

PATENT NO.   : 6,186,322 B1
DATED        : February 13, 2001
INVENTOR(S)  : Joseph H. Dautzenberg It is certified that error appears in the above-identified patent and that said Letters Patent is hereby corrected as shown below:

<u>Title page,</u>
Item [54], "COMPACTS" should read -- COMPACT -- and insert -- Related U.S. Application Data item [63] Continuation of Application No. PCT/NL97/00515, Sep. 10, 1997 -- and -- [30] Foreign Application Priority Data Dec. 18, 1996 (NL) ... 1004816 --

<u>Column 1,</u>
Line 1, "COMPACTS" should read -- COMPACT --
Line 5, before "FIELD" insert -- This application is a continuation of International Application PCT/NL97/00515 filed on SEPTEMBER 10, 1997 and which designated the U.S., claims the benefit thereof and incorporates the same by reference."

Signed and Sealed this

Sixteenth Day of October, 2001

*Attest:*

NICHOLAS P. GODICI
*Attesting Officer*   *Acting Director of the United States Patent and Trademark Office*